3,383,338
FLAME-RETARDANT, NON-SHRINKING UREA-FORMALDEHYDE FOAMS AND PROCESS OF MAKING SAME

Rodney L. Wells, Chester, and Ged H. Justice, Hopewell, Va., assignors to Allied Chemical Corporation, New York, N.Y., a corporation of New York
No Drawing. Filed Oct. 17, 1963, Ser. No. 317,078
4 Claims. (Cl. 260—2.5)

The present invention relates to flame-retardant urea-formaldehyde insulating foams, and to a process for preparing such foams wherein excessive shrinkage of the foam during curing and drying is avoided.

Resinous foams prepared from aqueous-urea-formaldehyde solutions, hardened and cured by an acidic hardening agent followed by curing and drying to eliminate residual water are known. Either the aqueous urea-formaldehyde resin solution or the aqueous hardener solution (i.e., an aqueous solution of an acidic material) may be first converted into a foam by the incorporation of a foaming agent therein such as a surface active agent, followed by foam production, as by whipping up the solution in a beater or by atomizing air or other inert gas into the solution. The foam is then blended with the other resin component, whereupon the acid in the hardener component acts to cure and harden the resinous foam without collapse of the foam. Residual water may be eliminated by drying at room temperature or at slightly elevated temperatures.

Urea-formaldehyde foams are useful for insulating purposes and may be deposited immediately upon preparation of the foam into the structures to be insulated, for example into cavities in the walls and ceilings of homes and other structures. Such foams have the added advantage of being substantially flame retardant usually to a sufficient extent as to be rated "self-extinguishing" as tested according to ASTM Test Method D–1692–59T.

In the curing and drying process, however, conventionally prepared urea-formaldehyde resin foams have the disadvantage of undergoing excessive shrinkage often suffering a linear shrinkage of up to 10% or higher. This shrinkage tendency limits the adaptability of such foams for insulating purposes and when used for home and other building insulation wherein wall and ceiling cavities are filled with freshly prepared foam, produces insulation which on curing and drying no longer completely fills the cavities but leaves non-insulating voids throughout the treated areas.

We have found that the addition of a small proportion of a polyethylene glycol to the ureau-formaldehyde resin solution prior to foaming reduces the lineal shrinkage of the resulting cured and dried resin foams so significantly as to render them no longer objectionable in this regard. For example, we have found that addition to the resin solution of between about 14% and about 30% (based on the weight of the urea-formaldehyde resin solids) of polyethylene glycol having a molecular weight in the range between about 200 and about 600, reduces the lineal shrinkage of the resin to not more than about 3% of the length of the freshly prepared wet foam.

Unfortunately, the presence of the polyethylene glycol in the foam so enhances the flammability of the resultant foam that the foam is no longer "self-extinguishing" but actually will sustain combustion.

A primary object of the present invention is to provide a substantially non-shrinking urea-formaldehyde foam having flame-retardant properties.

Another object of the invention is to render self-extinguishing a polyethylene glycol-containing foam which normally will sustain combustion.

A still further object of the invention is to provide a process for preparing non-shrinking, flame-retardant urea-formaldehyde insulating foams.

According to our present invention we provide a urea-formaldehyde resinous foam composition which is substantially non-shrinking and which is "self-extinguishing" as rated by ASTM Test D–1692–59T. This is accomplished by adding to the polyethylene glycol-containing resin solution, a small amount, at least about 0.6%, preferably between about 0.6% and about 2.0% by weight (based on the weight of the urea-formaldehyde resin solids) and a dialkyl alkanephosphonate having from one to two carbon atoms in the alkyl groups, for example, dimethyl methanephosphonate, and effecting the cure of the resin solution with an acidic hardener comprising phosphoric acid. It is surprising that both phosphoric acid and dialkyl alkanephosphonate must be present and they appear to accomplish a true synergistic effect since relatively large amounts of either additive alone does not make the foam self-extinguishing. The dialkyl alkanephosphonate used in our invention has the following formula

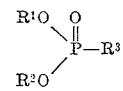

wherein $R^1$, $R^2$ and $R^3$ are selected from the group consisting of alkyl groups having from 1 to 2 carbon atoms, i.e., methyl and ethyl. Suitable dialkyl alkanephosphonates are dimethyl methanephosphonate, diethyl ethanephosphonate, methylethyl ethanephosphonate and methylethyl methanephosphonate. The amount of dialkyl alkanephosphonate should be at least about 0.6% by weight based on the urea-formaldehyde resin solids to afford a self-extinguishing foam. Greater quantities can be used, and amounts up to 10% or higher have been used without damage to the foam, but amounts greater than about 2% appear to add no advantages to the fireproofing properties of the foam, and hence use of such quantities are not preferred.

In carrying out the process according to our invention a urea-formaldehyde solution is prepared in conventional manner having a solids content between about 50% and about 65%, a mol ratio of formaldehyde to urea between about 1.5 and about 2.2. To this solution are added between about 14% and about 30% of a polyethylene glycol having a molecular weight between about 200 and about 60 based on the weight of the urea-formaldehyde resin solids, calculated as all the urea and all the formaldehyde used in the resin, and between about 0.6% and about 2% of the dialkyl alkanephosphonate, based on the weight of the urea-formaldehyde resin solids.

A hardener solution is separately prepared comprising an aqueous phosphoric acid solution of a foaming agent, preferably about a 2 to 6% phosphoric acid solution containing between about 2% and about 8% of a conventional foaming agent such as an alkyl aryl sulfonic acid, alkyl sulfate, or alkyl sulfonate.

The hardener solution is converted to a foam, as by atomizing air or other inert gas into the solution. Then resin solution and foamed phosphoric acid-containing hardener solution are mixed in proportions in a weight ratio between about 0.5 and about 2.3 parts of hardener solution per part of resin solution. The mixing may be effected in a mixing tank or in a foam gun and the resulting foam may be delivered to a mold or to any cavity to which it is desired to supply an insulating material and maintained in such cavity until the foam has hardened by the action of the curing catalyst and substantially all the water has evaporated.

In our preferred process, the resin solution used is prepared as follows: Formaldehyde and urea are reacted in a 2 to 1 mol ratio. The proper amounts of formaldehyde and urea are dissolved in water to give a 50% to 55% solution. A few percent of ethylene glycol is added and the pH of the solution is adjusted to 8 with 4 N NaOH. The resulting solution is heated to 95° C. and held there for thirty minutes. At this point the pH of the solution is adjusted to 4.5 with 4 N formic acid and the solution is heated at about 100° C. for ten to thirty minutes. This "acid reaction" is carried out long enough so that the resin solution remains clear when a test portion is cooled to 25° C. The acid reaction is also carried out long enough to give a solution with a viscosity of 15 to 30 centipoises at 25° C.

When the acid reaction is complete as determined by the above two criteria, the pH of the solution is adjusted to 7.5 to 8.0 with 4 N NaOH and the solution is cooled to ambient temperature as rapidly as possible. When the solution is cool a few percent of ammonium carbonate or ammonium bicarbonate is added to decrease formaldehyde odor. After this addition is complete, polyethylene glycol having an average molecular weight of 200–600 is added to give 14% to 30% based on the urea-formaldehyde resin solids and dimethyl methanephosphonate is added to give 0.6% to 2.0% based on the resin solids.

Resin prepared in this way can be stored for at least two months. For actual insulation, more urea is preferably dissolved in the resin to lower the mol ratio of formaldehyde to urea to between 1.5 and 1.7 to 1.

Foam is produced by frothing a hardener solution which is composed of 2 to 5% by weight of a surfactant such as Nacconol SZA (alkyl aryl sulfonic acids) and 2 to 4% by weight phosphoric acid, then blending the resin described above into the hardener froth by a suitable machine. Self-extinguishing foam with densities from 0.2 to 1.0 pound per cubic foot are readily prepared by mixing the resin solution and the foamed hardener solution in weight ratio between 0.5 and 2.3 parts of hardener per part of resin solution and permitting the resultant mixture to harden and dry.

The resulting resinous foam after curing and drying will be composed of between about 12% and about 22% by weight of polyethylene glycol and between about 0.4% and about 1.7% by weight of dialkyl alkanephosphonate and between about 1.0% and about 5.0% by weight of phosphoric acid, the balance urea-formaldehyde resin solids.

The resulting foams, after curing and drying are sufficiently flame retardant as to be rated "self-extinguishing" when tested according to ASTM Test Method D–1692–59T, and have linear shrinkage values of not more than about 3%, usually less than about 1%. These foams are useful as insulating barriers in the ceilings and walls of homes and other structures, and in any applications wherein light weight insulation is desired.

The ASTM D–1692–59T test is carried out by preparing a plastic foam specimen 2 inches by 6 inches by ½ inch, and marking each specimen across its width by two lines 1 and 5 inches, respectively from one end of the specimen. In making the test, specimens are supported on hardware cloth and placed horizontally with one end touching a bent up portion of the support. A Bunsen burner with wing top is placed under the bent up end of the specimen support with one edge of the flame in line with the vertical section of hardware cloth and the other edge of the flame extending to the front edge of the specimen, and the center of the width of the wing top directly under the center of the specimen. The burner is removed at the end of 1 minute or when the flame front reaches the first gage mark. If no evidence of ignition is seen after removal of the flame, the specimen is rated "nonburning by this test." If the specimen continues to burn after removal of the flame, and burns past the second gage mark it is rated "burning by this test." If the specimen burns on exposure to the flame, but does not burn past the second gage mark on removal of the flame, it is rated "self-extinguishing by this test."

Lineal shrinkage of the foam is measured by feeding the thoroughly blended urea-formaldehyde-acedic hardener-containing foam to a mold cavity 8 feet long by 16 inches wide by four inches deep (the mold being placed horizontally to simulate the cavities between "two by fours" in the ceiling of a dwelling). The cavity is completely filled, and then allowed to remain at ambient room temperatures (ca. 20–30° C.) for two weeks when the length of the foam bat in the panel is measured. A normal urea-formaldehyde foam of the character described herein, but containing no polyethylene glycol will often shrink up to 10% or higher of its length leaving spaces of up to 5 inches at each end of the panel, i.e. as much as 10 inches or more of total unfilled space at the ends of the panel.

The following specific examples further illustrate our invention. Parts are by weight except as otherwise noted.

Example 1

A resin stock solution was prepared by mixing 66 parts of about 37% formalin (uninhibited) equivalent to 24 parts of formaldehyde, 24 parts of urea and 1 part of ethylene glycol. The mixture was adjusted to pH 8.0 with 4 N sodium hydroxide, heated to about 95° C. and held at that tempertaure for thirty minutes. The pH gradually drifted to about 5.5 during this time. The pH of the solution was then lowered to 4.5 with 4 N formic acid and the solution was heated at 96° C. to 103° C. an additional 10 minutes. The solution at this point was water soluble, viscosity was 25 centipoises at 25° C., and solution remained clear when a test portion was cooled to 25° C. The pH was raised to about 8.5 with 4 N. sodium hydroxide and the resin cooled to room temperature (about 25° C.). To the cooled resin was added 0.8 part of ammonium bicarbonate, 8 parts of polyethylene glycol having an average molecular weight of 300 and 0.5 part of dimethyl methanephosphonate. The resin solution was readjusted to pH 8.0 with 4 N sodium hydroxide. Viscosity of the resulting resin was twenty-seven centipoises at 25° C. as measured by a Brookfield Model LVF viscometer. Prior to use, six parts urea were dissolved in the resin to adjust the formaldehyde to urea mol ratio fro 2.0 to 1.6.

A hardener stock solution was prepared by mixing 4 parts of Nacconol SZA, an alkyl benzene sulfonic acid composition, 4 parts 85% phosphoric acid with 92 parts water.

Foam was prepared by atomizing air into 1600 parts of the hardener solution and mixing 800 parts of resin therewith in a mixing chamber and allowing the foam to flow into suitable molds where it hardened within a few minutes at room temperature. Foam density was about 0.4 pound per cubic foot after drying for two weeks at room temperature. Shrinkage was less than 1% on a linear basis. The dry foam was indicated to be "self-extinguishing" when tested in accordance with ASTM D-1692-59T, which is a standard flammability test.

Example 2

A resin stock solution was prepared by heating a mixture of 100 parts UF Concentrate 85 (equivalent to 15 parts water, about 60 parts formaldehyde and about 25 parts urea), 35 parts urea, 2.5 parts ethylene glycol and 90 parts water for thirty minutes at about 95° C. The pH was initially adjusted to 8, later drifted to about 6.3. The pH was then adjusted from 6.3 to 4.5 with 4 N formic acid. The solution was heated for an additional ten minutes at 96° C.–104° C., then was neutralized with 4 N sodium hydroxide to pH 8.0 and cooled to room temperature (25° C.). The solution was clear. Viscosity of the resin solution was 16 centipoises. Two parts of ammonium bicarbonate, 15 parts urea and 24 parts polyethylene glycol of 300 molecular weight were added to the resin and pH was adjusted to 8.0 with 4 N sodium hydroxide. The resulting resin stock soluiion had a viscosity of 23 centipoises and formaldehyde-urea mol ratio of 1.6. Prior to foaming, 0.5 part of dimethyl methanephosphonate was mixed with 100 parts of resin.

The above resin solution was substituted for the resin solution of Example 1 to prepare an insulating foam, other conditions were kept the same. The resulting foam appeared identical to the foam of Example 1. It had a shrinkage less than 1% and rated "self-extinguishing" when tested according to ASTM-D-1692-59T.

Use of diethyl ethanephosphonate in the above examples gives similar results.

Example 3

In order to illustrate the synergistic effect of the dimethyl methanephosphonate in the resin solution and phosphoric acid in the hardener solution, a series of foams was prepared wherein polyethylene glycol was added to the resin solution with no dimethyl methanephosphonate and these resins were blended and cured with two different foamed hardeners, one containing phosphoric acid, the other containing sulfuric acid as hardening agent. Separate portions of another resin solution, containing as additives both polyethylene glycol and dimethyl methanephosphonate were cured with different foamed hardeners, one containing phosphoric acid, the other containing sulfuric acid as hardening agent. Of the four foams so prepared, only the foam which contained dimethyl methanephosphonate in the resin solution and phosphoric acid in the foamed hardener rated "self-extinguishing" in the ASTM flammability test.

Details of the preparation of the foams and results of the ASTM foam flammability tests are given below.

Resin Solution A was prepared by heating a mixture of 100 parts UF Concentrate 85 (equivalent to 15 parts water, about 60 parts formaldehyde and about 25 parts urea), 35 parts urea, 2.5 parts ethylene glycol and 90 parts water for thirty minutes at about 95° C. The pH was initially adjusted to 8, later drifted to about 6.3. The pH was then adjusted from 6.3 to 4.5 with 4 N formic acid. The solution was heated for an additional ten minutes at 96° C.–104° C., then was neutralized with 4 N sodium hydroxide to pH 8.0 and cooled to room temperature (25° C.). Two parts of ammonium bicarbonate, 15 parts urea and 24 parts polyethylene glycol of 300 molecular weight were added to the resin and pH was adjusted to 8.0 with 4 N sodium hydroxide. The resulting resin stock solution had a viscosity of 23 centipoises and formaldehyde-urea mol ratio of 1.6.

Resin Stock Solution B was prepared by mixing 99.5 parts of Resin Stock Solution A with 0.5 part of dimethyl methanephosphonate.

Hardener Solutoins A and B were prepared as follows:

(A) Sulfuric Acid Hardener Solution:
Four parts of Nacconol SZA (an alkyl benzene sulfonic acid), 1 part 96% $H_2SO_4$ and 95 parts $H_2O$.

(B) Phosphoric Acid Hardener Solution:
Four parts of Nacconol SZA (an alkyl benzene sulfonic acid), 4 parts 85% $H_3PO_4$ and 92 parts $H_2O$.

Foams were then prepared from all four combinations of the above resin solutions A and B and hardener solutions A and B.

Foam was prepared by foaming 1600 parts of the hardener solution A or B and mixing 800 parts of resin A or B therewith in a mixing chamber and allowing the foam to flow into suitable molds where it hardened within a few minutes at room temperature. Foam density was about 0.3 to 0.4 pound per cubic foot after drying for two weeks at room temperature. Flammability tests carried out on the dried foams are shown in the following table:

TABLE.—FOAM FLAMMABILITY TESTS ASTM–1692–59T

| Resin additives* | Acid in Hardener | ASTM Rating | Burning Rate, in./min. | Extent of Burning, inches |
|---|---|---|---|---|
| 18% PEG-300 | 4% $H_3PO_4$ | B | 11 | |
| 18% PEG-300, 1% DMMP | 4% $H_3PO_4$ | SE | | 2.1 |
| 18% PEG-300, 1% DMMP | 1% $H_2SO_4$ | B | 5 | |
| 18% PEG-300 | 1% $H_2SO_4$ | B | 11 | |

*Percent of additive based on urea-formaldehyde resin solids.
DMMP=Dimethyl methanephosphonate.
B=Burning.
SE=Self-extinguishing.
PEG=Polyethylene glycol 300 molecular weight.

While the above describes the preferred embodiments of the invention, it will be understood that departures may be made therefrom within the scope of the specification and claims.

We claim:
1. A process for preparing a substantially non-shrinking, flame-retardant, solid urea-formaldehyde foam which comprises (1) preparing a dispersion of (a) an aqueous urea-formaldehyde resin solution having a urea-formaldehyde solids content between about 50% and about 65%, the balance water, (b) between about 14% and about 30% by weight based on the weight of the urea-formaldehyde resin solids of a polyethylene glycol having a molecular weight between about 200 and about 600 and (c) at least about 0.6% by weight on the same basis, of a dialkyl alkanephosphonate wherein the alkyl groups contain from 1 to 2 carbon atoms, (2) preparing a foamed hardener solution curing agent comprising an aqueous solution containing a small proportion of a foaming agent and between about 2% and about 6% of phosphoric acid, (3) mixing the resin solution and the foamed curing agent solution in a weight ratio between about 0.5 part and about 2.3 parts foamed-curing agent solution per part of resin solution to form a substantially homogeneous foam, and curing the foam.

2. The process according to claim 1 wherein the dialkyl alkanephosphonate is dimethyl methanephosphonate.

3. A substantially non-shrinking flame-retardant urea-formaldehyde foam composed of (1) between about 75% and about 90% urea-formaldehyde resin solids, (2) between about 12% and about 22% of polyethylene glycol of molecular weight between about 200 and about 600, (3) between about .4% and about 1.7% by weight of a dialkyl alkanephosphonate wherein the alkyl groups have from 1 to 2 carbon atoms and (4) between about 1% and about 5% of phosphoric acid.

4. The composition according to claim 3 wherein the dialkyl alkanephosphonate is dimethyl methanephosphonate.

References Cited

UNITED STATES PATENTS

| | | | |
|---|---|---|---|
| 2,807,595 | 9/1957 | Brown | 260—2.5 |
| 2,891,915 | 6/1959 | McCormack et al. | 260—2 |
| 3,039,977 | 6/1962 | Ingram | 260—2.5 |
| 3,134,742 | 5/1964 | Wismer et al. | 260—2.5 |

MURRAY TILLMAN, *Primary Examiner.*

N. FOBLON, M. FOELAK, *Assistant Examiners.*